United States Patent
Okamoto et al.

(10) Patent No.: US 6,472,460 B1
(45) Date of Patent: Oct. 29, 2002

(54) POLYMER COMPOSITE MATERIAL AND PROCESS FOR PREPARING THE SAME

(75) Inventors: Hirotaka Okamoto, Aichi (JP); Makoto Kato, Aichi (JP); Naoki Hasegawa, Aichi (JP); Arimitsu Usuki, Aichi (JP); Norio Sato, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/424,240

(22) PCT Filed: Jun. 19, 1998

(86) PCT No.: PCT/JP98/02778
§ 371 (c)(1),
(2), (4) Date: Nov. 29, 1999

(87) PCT Pub. No.: WO99/50340
PCT Pub. Date: Oct. 7, 1999

(30) Foreign Application Priority Data

Mar. 30, 1998 (JP) .............................. 10-103637

(51) Int. Cl.$^7$ ................................. C08L 3/34
(52) U.S. Cl. .................. 524/445; 524/449; 524/236
(58) Field of Search ................. 523/313, 209, 523/207; 524/445, 447; 366/79

(56) References Cited

U.S. PATENT DOCUMENTS

| | | | |
|---|---|---|---|
| 4,739,007 A | | 4/1988 | Okada et al. |
| 5,102,948 A | | 4/1992 | Deguchi et al. |
| 5,385,776 A | * | 1/1995 | Maxfield et al. ............. 428/297 |
| 5,747,560 A | * | 5/1998 | Christiani et al. ........... 523/209 |
| 6,060,549 A | * | 5/2000 | Li et al. ........................ 524/445 |
| 6,117,932 A | | 9/2000 | Hasegawa et al. ........... 524/445 |

FOREIGN PATENT DOCUMENTS

| | | |
|---|---|---|
| DE | 38 88 371 T 2 | 7/1994 |
| DE | 198 42 845 A 1 | 4/1999 |
| JP | 61-179716 | 8/1986 |
| JP | 4-33955 | 2/1992 |
| JP | 04033955 A | 2/1992 |
| JP | 6-93133 | 4/1994 |
| JP | 06093133 A | 4/1994 |
| JP | 7-251873 | 10/1995 |
| JP | 07251873 A | 10/1995 |
| JP | 9-48856 | 2/1997 |
| JP | 09048856 A | 2/1997 |
| JP | 9-217012 | 8/1997 |
| JP | 09217012 A | 8/1997 |
| JP | 10-1608 | 1/1998 |
| WO | WO 93/04117 | 3/1993 |
| WO | WO 93/04117 A1 * | 4/1993 ............ C08K/3/34 |

OTHER PUBLICATIONS

Kato, M.; Usuki, A., "Polymer–Clay Nanocomposites" In Polymer–Clay Nanocomposites; Pinnavaia, T. J.; Beall, G. W., Eds.; John Wiley & Sons, Ltd.: New York, 2000.*

Yasue, K.; Katahira S.; Yoshikawa, M.; Fujimoto, K. "In Situ Polymrization Route to Nylon 6–Clay Nanocomposites" In Polymer–Clay Nanocomposites; Pinnavaia, T. J.; Beall, G. W., Eds.; John Wiley & Sons, Ltd.: New York, 2000.*

* cited by examiner

Primary Examiner—David W. Wu
Assistant Examiner—Rip A. Lee
(74) Attorney, Agent, or Firm—Oblon, Spivak, McClelland, Maier & Neustadt, P.C.

(57) ABSTRACT

Polymeric composites may be produced by a process comprising melt-kneading an organophilic clay and a polymer at an average reduced pressure of at $5 \times 10^4$ Pa, a maximum reduced pressure of at least $1 \times 10^5$ Pa, and a total shear strain between $10^5$ and $10^7$, and/or a total shear energy per unit volume falling between $10^{10}$ and $10^{14}$ Pa. Polymeric composites produced under these conditions may have 50% or more of the entire layers of the layered organophilic clay dispersed as monolayers.

13 Claims, 2 Drawing Sheets

POLYMER COMPOSITE MATERIAL AND PROCESS FOR PREPARING THE SAME

TECHNICAL FIELD

The present invention relates to a polymeric composite material and a method for producing the same, especially to a kneading method.

BACKGROUND ART

In a conventional method for dispersing a clay layer in a thermoplastic resin, an organophilic clay and the thermoplastic resin are melt-kneaded in a twin-screw extruder. One of such kneading methods is disclosed in Japanese Laid-Open Patent Publication No. 9-217012. In this method, a kneading condition is set based on a mixing coefficient Mix and a shear coefficient F.

However, such a kneading condition involves difficulties in exerting a sufficient shear stress and a sufficient shear energy to an organophilic clay and a thermoplastic resin, resulting in insufficient micro-dispersion of a clay layer. Thus, when the kneading was performed under a conventional condition described above, the clay was aggregated into five layers in a thermoplastic resin. Accordingly, the gas barrier performance was poorer than that produced by a polymerization method such as that disclosed in Japanese Laid-Open Patent Publication No.62-74957.

DISCLOSURE OF THE INVENTION (Objective of the Invention)

An objective of the present invention is: to provide a polymeric composite material capable of micro-dispersing an organophilic clay in a thermoplastic resin and a method for producing the same.

(Constitution of the Invention)

The present invention is a method for producing a polymeric composite material comprising:

melt-kneading an organophilic clay and a polymer in a condition that the average value (P'ave) and the maximum value (P'max) of a reduced pressure on resin at one or more loading regions of a kneaded material comprising the organophilic clay and the polymer in a kneader are within the ranges shown below and that a total shear strain (A) and/or a total shear energy per unit volume (E) in all loading regions of the kneaded material are within the ranges of $P'ave \geq 5 \times 10^4 (Pa)$, $P'max \geq 1 \times 10^5 (Pa)$, $10^5 \leq A \leq 10^7$, and $10^{10}(Pa) \leq E \leq 10^{14}(Pa)$.

(Effect of the Invention)

In a method for producing a polymeric composite material according to the present invention, the average value (P'ave) of a reduced pressure on resin P' at one or more loading regions of a kneaded material in a kneader is $5 \times 10^4$ (Pa) or higher, and the maximum value (P'max) is $1 \times 10^5$ (Pa) or higher. With such values, there is no void in the loading region, resulting in no slip of a polymer upon being subjected to a shear stress, which enables an efficient application of a shear stress and/or a shear energy to the kneaded polymer.

Also in the inventive production method, a total shear strain (A) and/or a shear energy per unit volume (E) in all loading regions of the kneaded material are within the ranges: $10^5 \leq A \leq 10^7$, $10^{10}(Pa) \leq E \leq 10^{14}(Pa)$. With such values, an organophilic clay can uniformly be micro-dispersed without degrading any properties of a polymer.

(Effect of the Invention)

According to the method of the present invention, a sufficient shear stress can be applied to an organophilic clay and a polymer, thereby achieving a sufficient micro-dispersion of the organophilic clay layers throughout a polymer.

Also by using a polymeric composite material obtained according to the present invention, an article of the polymeric composite material which is excellent in its properties such as gas barrier performance, tensile strength and elongation can be obtained.

BEST MODE FOR CARRYING OUT THE INVENTION (Loading Region)

Figure 1:
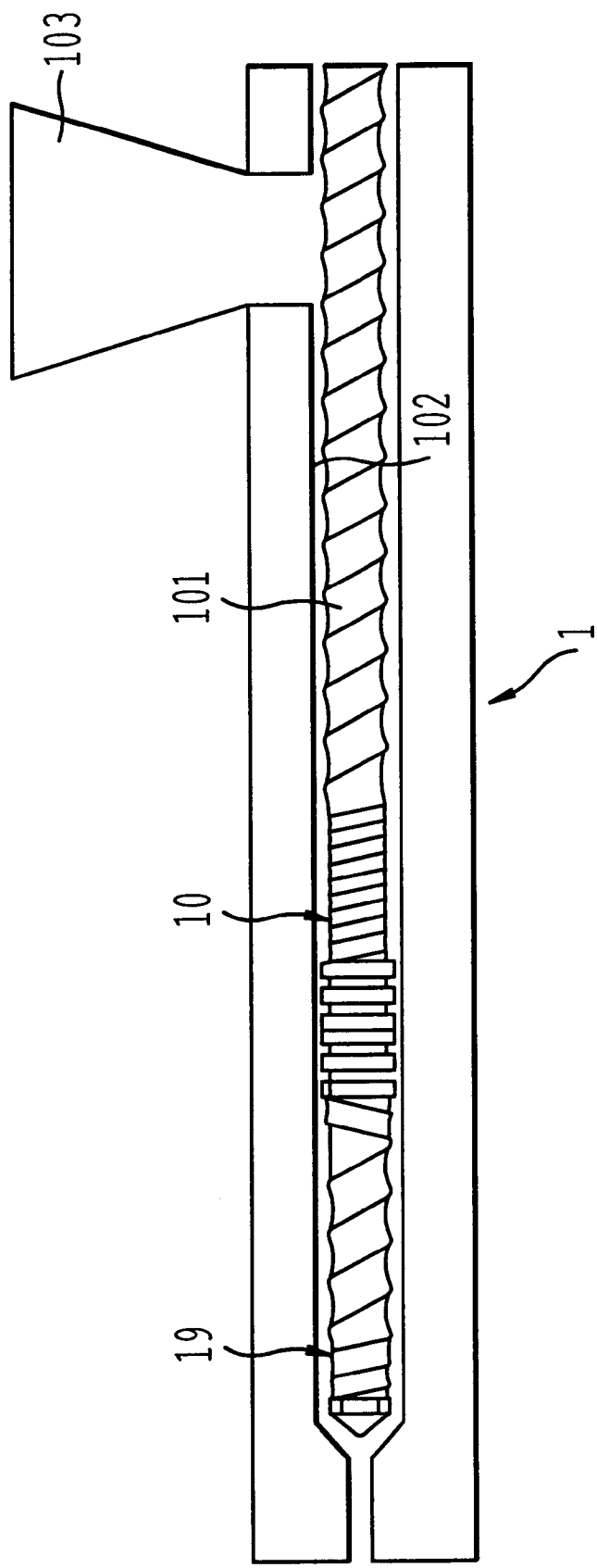
FIG. 1 is a schematic view of a loading region in a continuous kneader according to the present invention.

An expression "a loading region in a kneader" means a region in which a kneaded material consisting of an organophilic clay and a polymer is filled or a region which such a material passes through. For example, in the case of a continuous kneader 1 such as a twin-screw extruder, as shown in FIG. 1, a kneading part 10 including a backward conveying disk corresponds to the "loading region". In FIG. 1, a screw 101 a cylinder 102 and a hopper 103 are indicated. The region of a flow-out portion 19 is excluded.

In the case of a closed-type kneader such as a batch kneader, a gap between a screw and a cylinder corresponds to the "loading region". Thus, in the case of a closed-type kneader, the entire space except for the screw in the cylinder corresponds to the "loading region".

Only one "loading region" or a two or more may be present in a kneader. When two or more loading regions are present, the total shear strain (A) and/or the total shear energy (E) discussed above should be within the specified ranges in all of these loading regions, and P'ave and P'max should be within the specified ranges in at least one of these loading regions. The loading region in which P'ave is within the specified range should be identical to the loading region in which P'max is within the specified range.

(Reduced Pressure on Resin P')

An expression "reduced pressure on resin P' in a loading region in a kneader" means a pressure defined by Equation (1) shown below.

$$P' = P/\log\eta \qquad \text{Equation (1)}$$

P: Pressure on resin (Pa), η: Melt viscosity (Pa·s)

The pressure on resin P in Equation (1) means a pressure exerted to a thermoplastic resin in a loading region. A melt viscosity η in Equation (1) means a viscosity of a thermoplastic resin which is melted in a loading region and may vary depending on the resin temperature, the shear rate and the pressure of the loading region.

An expression "the average value (P'ave) of a reduced pressure on resin P'" means the average value of a reduced pressure on resin discussed above at one loading region.

An expression "the maximum value (P'max) of a reduced pressure on resin P'" means the maximum value of a reduced pressure on resin discussed above at one loading region.

Accordingly, when there are two or more loading regions, at least one loading region should fulfill the requirements of P'ave and P'max described above.

In the present invention, the average value (P'ave) of a reduced pressure on resin P'should be $5\times10^4$ (Pa) or higher and the maximum value (P'max) should be $1\times10^5$ (Pa) or higher. With such values, there is no void in the loading region, resulting in no slip of a polymer upon being subjected to a shear stress, which enables an efficient application of a shear stress and/or a shear energy to the kneaded polymer. On the other hand, a value of P'ave less than $5\times10^4$ (pa), or a value of P'max less than $1\times10^5$ (Pa) may result in an insufficient shear stress and/or shear energy exerted to the polymer.

In order to obtain an average value (P'ave) of a reduced pressure on resin P' within the range specified above in a practical case using a twin-screw extruder, various disk elements in different forms such as those forward conveying, neutral conveying and backward conveying may be used in combination appropriately to alter the ratio between the forward conveying flow and the backward conveying flow of a kneaded material, thereby adjusting the value.

In order to obtain a maximum value (P'max) of a reduced pressure on resin P' within the range specified above in a practical case using a twin-screw extruder, various disk elements in different forms such as those forward conveying, neutral conveying and backward conveying may be used in combination appropriately to alter the ratio between the forward conveying flow and the backward conveying flow of a material to be kneaded, thereby adjusting the value.

Preferably, P'ave is within the range from $5\times10^4$ to $2\times10^6$ (Pa) and P'max is within the range from $1\times10^5$ to $1\times10^7$ (Pa). Within these ranges, degradation of the properties of a polymer can be prevented more effectively.

(Total Shear Strain (A))

A term "total shear strain (A)" means a sum of the shear strain in all loading regions of a kneaded material in a kneader, and is defined by Equation (2) shown below.

$$(A)=\gamma'\times t \qquad \text{Equation (2)}$$

γ': Shear rate in all loading regions (s−1)

t: Residential time in all loading regions (s)

In the present invention, a total shear strain (A) is within the range of $10^5 \leq A \leq 10^7$. Within this range, an organophilic clay can uniformly be micro-dispersed without degrading the properties of a polymer. In addition, an advantage that the micro-dispersed organophilic clay can uniformly be dispersed in a polymeric composite material can be obtained. A total shear strain less than $10^5$ may result in an insufficient micro-dispersion of an organophilic clay. On the other hand, a total shear strain exceeding $10^7$ may result in a substantial deterioration of a polymer, which degrades the properties in the polymer.

A total shear strain (A) is preferably within the range of $10^5 \leq A \leq 10^6$. In this range, the degradation of the properties of a polymer can be prevented more effectively.

In order to obtain a total shear strain (A) within the range specified above in a practical case using a twin-screw extruder, the shear rate is increased by increasing a screw speed or the shear rate is increased by decreasing the tip clearance of a screw, or, alternatively, the residential time in a loading region is prolonged by using a large number of backward conveying disk elements of a screw, thereby adjusting the value.

(Shear Energy Per Unit Volume (E))

In the present invention, a term "total shear energy per unit volume (E)" means a sum of the values of the shear energy per unit volume in all loading regions of a kneaded material in a kneader, and is defined by Equation (3) shown below. The "total shear energy per unit volume (E)" is within the range of $10^{10}(\text{Pa}) \leq E \leq 10^{14}(\text{Pa})$.

$$E=\eta\times\gamma'^2\times t \qquad \text{Equation (3)}$$

η: Melt viscosity (Pa·s)

γ': Shear rate in all loading regions (s−1)

t: Residential time in all loading regions (s)

Within this range, an organophilic clay can uniformly be micro-dispersed without degrading the properties of a polymer. In addition, an advantage that the micro-dispersed organophilic clay can uniformly be dispersed in a polymeric composite material can be obtained. A total shear energy per unit volume less than $10^{10}$ (Pa) may result in an insufficient micro-dispersion of an organophilic clay. On the other hand, a total shear energy per unit volume exceeding $10^{14}$ (Pa) may result in a substantial deterioration of a polymer, which degrades the properties in the polymer.

In order to obtain a total shear energy E specified above in a practical case using, for example, a twin-screw extruder, various disk elements in different forms such as those forward conveying, neutral conveying and backward conveying may be used in combination appropriately to alter the ratio between the forward conveying flow and the backward conveying flow of a kneaded material and also the shear rate is increased by increasing a screw speed, thereby adjusting the value.

In Equations (2) and (3) shown above, the residential time t in a loading region is preferably 1 (s) or longer. In this manner, a sufficient melt-kneading time is obtained, and an organophilic clay can be micro-dispersed.

The value of E is preferably within the range from $1\times10^{10}$ to $1\times10^{12}$ (Pa). Within this range, the degradation of the properties of a polymer can be prevented more effectively.

(Melt-kneading)

A term "kneading" means a mechanical operation performed for the purpose of obtaining a condition that an organophilic clay is dispersed in a polymer by applying a shear stress to a mixture of the polymer and the organophilic clay under a certain pressure on resin or higher. A term "melting" is employed in its general meaning, that is, to heat a polymer into a fluidized state (a liquid phase).

The kneading and the melting may be conducted simultaneously, sequentially or alternately.

(Kneader)

A term "a kneader" means an apparatus capable of heating a polymer into a fluidized state thereby conducting the kneading operation described above. As the kneader, an apparatus intended to be used for melting and kneading such as a closed-type kneader and an extruder may typically be employed. Alternatively, an apparatus which auxiliary performs melting and kneading such as an injection molding machine (especially a slit thereof), a capillary-type rheometer or a closed coaxial double cylinder-type rheometer may also be employed.

When a kneading disk block for kneading is provided in a kneader, it is preferably provided in two or more sites. Such kneading disk blocks allow the micro-dispersion of an organophilic clay to be achieved more effectively while suppressing deterioration of a resin due to a heat generation by shear.

(Organophilic Clay)

Figure 2:
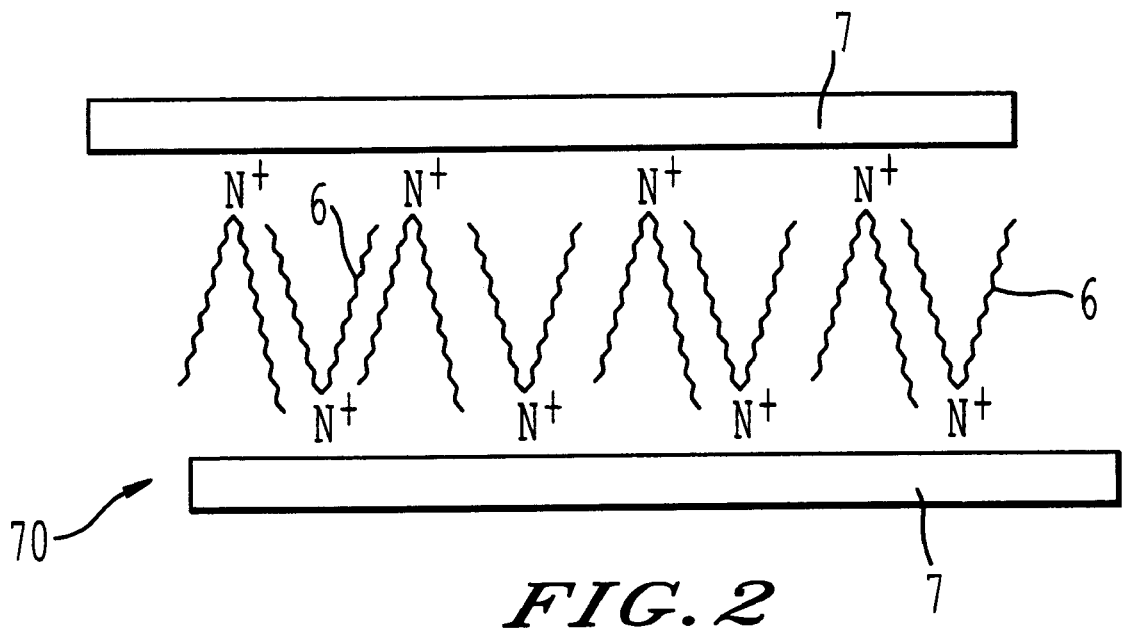
FIG. 2 is an explanatory view of an organophilic clay according to the present invention.

As shown in FIG. 2, an organophilic clay 70 means a clay which has been made organophilic as a result of bonding of an organic agent 6 to the surface of clay 7 (clay mineral). A clay is not specifically limited and a layered clay mineral may be exemplified. Such a layered clay mineral includes montmorillonite, saponite, hectorite, beidellite, stibensite, nontllite, mica and the like, and may be naturally occurred or synthesized.

As an organic agent, primary to quaternary ammonium, hexylammonium ion, octylammonium ion, 2-ethylhexylammonium ion, dodecylammonium ion, laurylammonium ion, octadecylammonium ion, dioctyldimethylammonium ion, trioctylammonium ion, dioctadecyldimethylammonium ion, trioctadecylammonium ion and the like may be employed.

(Polymer)

A polymer is not specifically limited, but includes, for example, polyester, polycarbonate, polyacetal, polyallylate, polyamide, polyamideimide, polyetherimide, polyphenylene ether, polyphenylene sulfide, polyether sulfone, polyether ketone, polyphthalamide, polyether nitrile, polyether sulfone, polybenzimidazole, polycarbodiimide, polysiloxane, acrylic resins such as polymethyl(meth)acrylate, poly(methacrylamide, acryl rubber, polyethylene tetrafluoride, fluorine resin, fluorine rubber, liquid crystal polymer, epoxy resin, melamine resin, urea resin, diallylphthalate resin, phenol resin, polysilane, silicone resin, urethane resin, polyethylene, polypropylene, polybutene, polypentene, ethylene-propylene copolymer, ethylene-butene copolymer, polybutadiene, polyisoprene, hydrogenated polybutadiene, hydrogenated polyisoprene, ethylene-propylene-diene copolymer, ethylene-butene-diene copolymer, butyl rubber, polymethylpentene, polystyrene, styrene-butadiene copolymer, styrene-hydrogenated butadiene copolymer and the like.

(Preferred Combinations)

It is also preferable that:

the organophilic clay is montmorillonite made organophilic with octadecylamine;

the polymer is Nylon 6;

the average value P'ave of the reduced pressure on resin is within the range from $5 \times 10^4$ to $2 \times 10^6$ (Pa);

the maximum value P'max of the reduced pressure on resin is within the range from $2 \times 10^5$ to $1 \times 10^7$ (Pa);

the total shear strain A is within the range from $1 \times 10^5$ to $1 \times 10^6$ (Pa); and, the total shear energy E is within the range from $1 \times 10^{10}$ to $1 \times 10^{12}$ (Pa). with such parameters, an organophilic clay can effectively be micro-dispersed.

(Another Method for Producing Preferred Polymeric Composite Material According to the Invention)

A method for producing another preferred polymeric composite material according to the present invention is a method for producing a polymeric composite material by subjecting an organophilic clay and a polymer to a melt-kneading process using a kneader, wherein the clay in the organophilic clay is a layered clay mineral and wherein 50% or more of the entire layers of the layered clay mineral are dispersed as monolayers in the polymer by means of the melt-kneading process.

Such a production method enables a sufficient micro-dispersion of an organophilic clay layer in a polymer.

The dispersed monolayers of a layered clay mineral less than 50% results in difficulty in micro-dispersing an organophilic clay layer sufficiently in a polymer.

A preferred ratio of the layer to be dispersed as monolayers in a polymer in the melt-kneading process described above to the entire layers of a layered clay mineral is 80% or higher. Such a ratio enables a further satisfactory micro-dispersion of the organophilic clay layer in the polymer.

(Another Method for Producing Polymeric Composite Material According to the Invention)

Another method for producing a polymeric composite material according to the present invention is a method for producing a polymeric composite material wherein the clay in the organophilic clay is a layered clay mineral, comprising:

melt-kneading the organophilic clay and the polymer in a condition that the average value (P'ave) and the maximum value (P'max) of a reduced pressure on resin at one or more loading regions of a kneaded material comprising the organophilic clay and the polymer in the kneader are within the ranges shown below and that a total shear strain (A) and/or a total shear energy per unit volume (E) in all loading regions of the kneaded material are within the ranges of $P'ave \geq 5 \times 10^4 (Pa)$, $P'max \geq 1 \times 10^5 (Pa)$, $10^5 \leq A \leq 10^7$, and $10^{10}(Pa) \leq E \leq 10^{14}(Pa)$; and, dispersing 50% or more of the entire layers of the layered clay mineral as monolayers in the polymer by means of the melt-kneading process.

(Post-treatment)

In a method for production according to the present invention, the melt-kneading process of a polymer and an organophilic clay under the condition specified above may directly be followed by a molding process, or, alternatively, a kneaded material is once taken out as a mass, which is then used for various purposes.

(Polymeric Composite Materials According to the Invention)

A polymer composite material according to the present invention is a polymeric composite material: comprising a polymer and an organophilic clay dispersed in said polymer, wherein the clay in the organophilic clay is a layered clay mineral and 50% or more of the entire layers of the layered clay mineral are dispersed as monolayers in the polymer;

wherein the polymeric composite material is produced by subjecting the polymer and the organophilic clay to a melt-kneading process using a kneader; and, wherein the melt-kneading process is performed in a condition that the average value (P'ave) and the maximum value (P'max) of a reduced pressure on resin at one or more loading regions of a kneaded material consisting of the organophilic clay and the polymer in the kneader are within the ranges shown below and that a total shear strain (A) and/or a total shear energy per unit volume (E) in all loading regions of the kneaded material are within the ranges of $P'ave \geq 5 \times 10^4 (Pa)$, $P'max \geq 1 \times 10^5 (Pa)$, $10^5 \leq A \leq 10^7$, and $10^{10}(Pa) \leq E \leq 10^{14}(Pa)$.

(Utility)

A polymeric composite material obtained according to the present invention may be subjected to various molding processes such as injection molding, extrusion molding, press molding, transfer molding, blow molding and the like to obtain an article of the polymeric composite material comprising an organophilic clay as being micro-dispersed in a polymeric matrix. A resultant article of the polymeric composite material is excellent in the physical properties such as gas barrier performance, tensile strength, elongation and the like. While no particular molding method is mentioned, a film obtained by an extrusion molding process may be exemplified as a high gas barrier material.

Examples of a polymeric composite material according to Embodiment of the invention were prepared together with comparatives, and examined and evaluated for their physical properties.

EXAMPLE 1

A sodium-type montmorillonite (trade name: KUNIPIA F produced by Kunimine Kogyo Co., Ltd.) having the cation exchange capacity of 115 meq/100 g was employed. 80 g of KUNIPIA F was dispersed in 5000 ml of water at 80° C. 28.5 g of octadecylamine (18 carbon atoms) as an organic agent and 11 ml of concentrated hydrochloric acid were dissolved in 2000 ml of water at 80° C. This solution was admixed with the aqueous dispersion of KUNIPIA F to obtain an organophilic montmorillonite (hereinafter referred to as C18-Mt).

C18-Mt thus obtained was washed three times with water at 80° C. and then freeze-dried. It was employed in this example after pulverizing. The inorganic substance content in C18-Mt determined by an ignition residue method was 68%.

2% by weight as inorganic substances of C18-Mt was added to Nylon 6 resin (Nylon 6 resin 1015 B produced by UBE Industries Ltd.). The mixture was melt-kneaded using a twin-screw extruder (TEX 30α produced by THE JAPAN STEEL WORKS LTD. ) with a special screw (type 1) capable of exerting a high reduced pressure, a high total shear strain and a high shear energy per unit volume to obtain a polymeric composite material. The kneading was performed at the screw speed of 3,00 rpm and at the resin temperature of 250° C. The average reduced pressure on resin (P'ave), the maximum reduced pressure on resin (P'max), the total shear strain A and the total shear energy E are shown in Table 1.

The polymeric composite material thus obtained was extruded as a strand, which was then cooled rapidly with water, and pelletized into a composite pellet using a strand cutter.

The composite pellet thus obtained was sectioned using a microtome into a super thin film. The film was observed for the dispersion condition of the clay layer using Jeol-200 CX produced by JEOL LTD., and evaluated in accordance with the following criteria.

○: Satisfactory dispersion condition. The clay layer is micro-dispersed as almost individual monolayers.

Δ: Poor dispersion condition. Aggregation of 2 or 3 layers is observed over 50%.

X: Extremely poor dispersion condition. Almost all of the dispersed layers are aggregations of several tens layers or more.

The composite pellet was extruded at 230° C. into a film whose thickness was 100 μm. The film was examined for its gas permeability according to ASTMD1434. The results are shown in Table 1.

The polymeric composite material described above was injection-molded using injection molding machines Model PS40E2ASE and FS75 produced by Nissei Resin Industries Ltd. to obtain a dumb-bell tensile test specimen. This molded article was subjected to a tensile test according to ASTMD638M to evaluate its tensile strength and expansion. The results are shown in Table 1.

EXAMPLE 2

Similarly as in Example 1 except for using a montmorillonite made organophilic with dodecylamine (12 carbon atoms) (hereinafter referred to as C12-Mt) to prepare a polymeric composite material and changing the screw speed, the average reduced pressure on resin P'ave, the maximum reduced pressure on resin P'max, the total shear strain A and the total shear energy E, Nylon 6 and C12-Mt were melt-kneaded to obtain a polymeric composite material, whose properties were then determined similarly. The results are shown in Table 1.

EXAMPLE 3

Similarly as in Example 1 except for changing the screw speed, the average reduced pressure on resin P'ave, the maximum reduced pressure on resin P'max, the total shear strain A and the total shear energy E, Nylon 6 and C18-Mt were melt-kneaded to obtain a polymeric composite material, whose properties were then determined similarly. The results are shown in Table 1.

EXAMPLES 4 to 7

Similarly as in Example 1 except for changing the resin supplying speed, the screw speed, the average reduced pressure on resin P'ave, the maximum reduced pressure on resin P'max, the total shear strain A and the total shear energy E as indicated in Table 1, Nylon 6 and C18-Mt were melt-kneaded to obtain a polymeric composite material, whose properties were then determined similarly. The results are shown; in Table 1.

EXAMPLE 8

Similarly as in Example 1 except for using Nylon 66 resin (Nylon 66 resin 2020B produced by Ube Industries Ltd.) instead of Nylon 6 resin, adding 1.5% by weight as inorganic substances of C12-Mt, and changing the screw speed, the average reduced pressure on resin P'ave, the maximum reduced pressure on resin P'max, the total shear strain A and the total shear energy E as indicated in Table 2, Nylon 66 and C12-Mt were melt-kneaded to obtain a polymeric composite material, whose properties were then determined similarly. The results are shown in Table 2.

EXAMPLE 9

Similarly as in Example 1 except for using Nylon 12 resin (Nylon 12 resin 3024B produced by Ube Industries Ltd.) instead of Nylon 6 resin, adding 2.2% by weight as inorganic substances of C18-Mt, changing the screw speed, the average reduced pressure on resin P'ave, the maximum reduced pressure on resin P'max and the total shear energy E as indicated in Table 2 and setting the resin temperature to 210° C. in kneading, Nylon 12 and C18-Mt were melt-kneaded to obtain a polymeric composite material.

The polymeric composite material thus obtained was subjected to the determination similar to that in Example 1 and the results obtained are shown in Table 2.

EXAMPLE 10

Similarly as in Example 1 except for using Nylon 6/66 copolymer resin (Nylon 6/66 copolymer resin 5033B produced by Ube Industries Ltd., hereinafter referred to as a copolymer nylon) instead of Nylon 6 resin, changing the resin supplying speed, the average reduced pressure on resin P'ave, the maximum reduced pressure on resin P'max, the total shear strain A and the total shear energy E as indicated in Table 2 and setting the resin temperature to 270° C. in kneading, Nylon 6/66 and C18-Mt were melt-kneaded to obtain a polymeric composite material.

The obtained polymeric composite material was evaluated for the dispersion state of the clay layer and the gas permeability similarly to Example 1. The results are shown in Table 2.

EXAMPLE 11

Similarly as in Example 1 except for using Nylon 46 resin (Nylon 46 resin TS300 produced by DSM Engineering Plastic Products, Inc.) instead of Nylon 6 resin, adding 1.5% by weight as inorganic substances of C12-Mt, changing the average reduced pressure on resin P'ave, the maximum reduced pressure on resin P'max, the total shear strain A and the total shear energy E as indicated in Table 2 and setting the resin temperature to 320° C. in kneading, Nylon 46 and C12-Mt were melt-kneaded to obtain a polymeric composite material. The obtained polymeric composite material was evaluated for the dispersion state of the clay layer, the tensile strength and the elongation similarly to Example 1. The results are shown in Table 2.

EXAMPLE 12

Similarly as in Example 1 except for using Nylon 11 resin (Nylon 11 resin BMN0 produced by Elf ATOCHEM Inc.) instead of Nylon 6 resin, adding 1.5% by weight as inorganic substances of C12-Mt, changing the screw speed, the average reduced pressure on resin P'ave, the maximum reduced pressure on resin P'max, the total shear strain A and the total shear energy E as indicated in Table 2 and setting the resin temperature to 210° C. in kneading, Nylon 11 and C12-Mt were melt-kneaded to obtain a polymeric composite material.

The obtained polymeric composite material was evaluated for the dispersion state of the clay layer, the tensile strength and the elongation similarly to Example 1. The results are shown in Table 2.

EXAMPLE 13

Similarly as in Example 1 except for using Nylon 610 resin (Nylon 610 resin CM2001 produced by Toray Industries, Inc.) instead of Nylon 6 resin, adding 2.5% by weight as inorganic substances of C18-Mt, changing the average reduced pressure on resin P'ave, the maximum reduced pressure on resin P'max and the total shear energy E as indicated in Table 2 and setting the resin temperature to 260° C. in kneading, Nylon 610 and C18-Mt were melt-kneaded to obtain a polymeric composite material.

The obtained polymeric composite material was evaluated for the dispersion state of the clay layer, the tensile strength and the elongation similarly to Example 1. The results are shown in Table 2.

EXAMPLE 14

Similarly as in Example 1 except for using a polyphthalamide resin (Polyphthalamide resin ET1001 produced by TEIJIN AMODEL Co., Ltd., hereinafter referred to as an aromatic nylon) instead of Nylon 6 resin, changing the average reduced pressure on resin P'ave, the maximum reduced pressure on resin P'max and the total shear energy E as indicated in Table 2 and setting the resin temperature to 320° C. in kneading, Polyphthalamide resin and C18-Mt were melt-kneaded to obtain a polymeric composite material.

The obtained polymeric composite material was evaluated for the dispersion state of the clay layer, the tensile strength and the elongation similarly to Example 1. The results are shown in Table 2.

Comparative Example 1

After swelling a montmorillonite made organophilic with 12-aminododecanoic acid (12 carbon atoms) (hereinafter referred to as $C12_{COOH}$-Mt) with a monomer of Nylon 6, the polymerization was initiated to obtain a Nylon 6-clay composite. It was then subjected to the test similar to that in Example 1 and evaluated for its properties. The results are shown in Table 3.

Comparative Example 2

Similarly as in Example 1 except for using an ordinary twin-screw kneading screw (type 2) and changing the screw speed, the average reduced pressure on resin P ave, the maximum reduced pressure on resin P'max, the total shear strain A and the total shear energy E as indicated in Table 3, Nylon 6 and C18-Mt were melt-kneaded to obtain a polymeric composite material. It was subjected to the test similar to that in Example 1 and the results obtained are shown in Table 3.

Comparative Example 3

Similarly as in Example 1 except for using a compact twin-screw kneader for a small scale test (Model SLKRC kneader produced by KURIMOTO LTD.) and changing the resin supplying speed, the screw speed, the average reduced pressure on resin P'ave, the maximum reduced pressure on resin P'max, the total shear strain A and the total shear energy E as indicated in Table 3, Nylon 6 and C18-Mt were melt-kneaded to obtain a polymeric composite material. It was subjected to the test similar to that in Example 1 and the results obtained are shown in Table 3.

Comparative Example 4

Similarly as in Example 1 except for using a closed-type kneader (LABOPLASTMILL produced by TOYO SEIKI CO., LTD.) for melt-kneading instead of a twin-screw extruder and changing the average reduced pressure on resin P'ave, the maximum reduced pressure on resin P'max, the total shear strain A and the total shear energy E as indicated in Table 3, Nylon 6 and C18-Mt were melt-kneaded to obtain a polymeric composite material. It was subjected to the test similar to that in Example 1 and the results obtained are shown in Table 3.

Comparative Example 5

Similarly as in Example 1 except for using a special high speed rheometer (exerting a low total shear strain and a low shear energy, in spite of a high shear rate, due to a short residential time in a loading region) for kneading, Nylon 6 and C18-Mt were melt-kneaded to obtain a polymeric composite material. It was subjected to the similar determination and the results obtained are shown in Table 3.

The special high speed rheometer was developed previously by us by modifying a capillary-type rheometer. It can provide a flow at a super high shear rate ($10^4 < \gamma' < 10^8 (s^{-1})$) in a capillary.

Comparative Example 6

Similarly as in Example 1 except for changing the resin supplying speed, the screw speed, the average reduced pressure on resin P'ave, the maximum reduced pressure on resin P'max, the total shear strain A and the total shear energy E as indicated in Table 3, Nylon 6 and C18-Mt were melt-kneaded to obtain a polymeric composite material. It was subjected to the test similar to that in Example 1 and the results obtained are shown in Table 3.

Comparative Example 7

Similarly as in Example 1 except for using an ordinary twin-screw kneading screw (type 2) and changing the resin supplying speed, the screw speed, the average reduced pressure on resin P'ave, the maximum reduced pressure on resin P'max, the total shear strain A and the total shear energy E as indicated in Table 3, Nylon 6 and C18-Mt were melt-kneaded to obtain a polymeric composite material. It was subjected to the test similar to that in Example 1 and the results: obtained are shown in Table 3.

Comparative Example 8

Similarly as in Example 9 except for using the screw type employed in Comparative Example 2 (type 2) and changing the average reduced pressure on resin P'ave, the maximum reduced pressure on resin P'max, the total shear strain A and the total shear energy E as indicated in Table 4, Nylon 12 and C18-Mt were melt-kneaded to obtain a polymeric composite material.

It was subjected to the test similar to that in Example 9 and the results obtained are shown in Table 4.

Comparative Example 9

Similarly as in Example 10 except for using the screw type employed in Comparative Example 2 (type 2) and changing the screw speed, the average reduced pressure on resin P'ave, the maximum reduced pressure on resin P'max, the total shear strain A and the total shear energy E as indicated in Table 4, Nylon 6/66 copolymer resin and C18-Mt were melt-kneaded to obtain a polymeric composite material. The obtained polymeric composite material was evaluated for the dispersion state of the clay layer and the gas permeability similarly to Example 10. The results obtained are shown in Table 4.

Comparative Example 10

Similarly as in Example 11 except for using the screw type employed in Comparative Example 2 (type 2) and changing the screw speed, the average reduced pressure on resin P'ave, the maximum reduced pressure on resin P'max, the total shear strain A and the total shear energy E as indicated in Table 4, Nylon 46 resin and C12-Mt were melt-kneaded to obtain a polymeric composite material.

The obtained polymeric composite material was evaluated for the dispersion state of the clay layer, the tensile strength and the elongation similarly to Example 11. The results obtained are shown in Table 4.

Comparative Example 11

Similarly as in Example 12 except for using the screw type employed in Comparative Example 2 (type 2) and changing the screw speed, the average reduced pressure on resin P'ave, the maximum reduced pressure on resin P'max, the total shear strain A and the total shear energy E as indicated in Table 4, Nylon 11 resin and C12-Mt were melt-kneaded to obtain a polymeric composite material.

The obtained polymeric composite material was evaluated for the dispersion state of the clay layer, the tensile strength and the elongation similarly to Example 12. The results obtained are shown in Table 4.

Comparative Example 12

Similarly as in Example 13 except for using the screw type employed in Comparative Example 2 (type 2) and changing the screw speed, the average reduced pressure on resin P'ave, the maximum reduced pressure on resin P'max, the total shear strain A and the total shear energy E as indicated in Table 4, Nylon 610 resin and C18-Mt were melt-kneaded to obtain a polymeric composite material.

The obtained polymeric composite material was evaluated for the dispersion state of the clay layer, the tensile strength and the elongation similarly to Example 13. The results obtained are shown in Table 4.

Comparative Example 13

Similarly as in Example 14 except for using the screw type employed in Comparative Example 2 (type 2) and changing the screw speed, the average reduced pressure on resin P'ave, the maximum reduced pressure on resin P'max, the total shear strain A and the total shear energy E as indicated in Table 4, Polyphthalamide resin and C18-Mt were melt-kneaded to obtain a polymeric composite material.

The obtained polymeric composite material was evaluated for the dispersion state of the clay layer, the tensile strength and the elongation similarly to Example 14. The results obtained are shown in Table 4.

TABLE 1

|  | Example 1 | Example 2 | Example 3 | Example 4 | Example 5 | Example 6 | Example 7 |
| --- | --- | --- | --- | --- | --- | --- | --- |
| Kind of resin | Nylon 6 | Nylon 6 | Nylon 6 | Nylon 6 | Nylon 6 | Nylon 6 | Nylon 6 |
| Type of organophilic clay (1) | C18-Mt | C12-Mt | C18-Mt | C18-Mt | C18-Mt | C18-Mt | C18-Mt |
| Added amount of organophilic clay (wt %) (2) | 2 | 2 | 2 | 2 | 2 | 2 | 2 |
| Screw type (3) | type 1 | type 1 | type 1 | type 1 | type 1 | type 1 | type 1 |
| Resin supplying speed (kg/h) | 10 | 10 | 10 | 4 | 20 | 4 | 2 |
| Screw speed (rpm) | 300 | 500 | 1000 | 50 | 200 | 2000 | 2500 |
| Average reduced pressure on resin P'ave (Pa) (4) | $1.4 \times 10^5$ | $2.4 \times 10^5$ | $4.1 \times 10^5$ | $7.3 \times 10^4$ | $8.7 \times 10^4$ | $1.1 \times 10^5$ | $8.4 \times 10^4$ |
| Maximum reduced pressure on resin P'max (Pa) (5) | $2.3 \times 10^5$ | $3.8 \times 10^5$ | $6.1 \times 10^5$ | $2.0 \times 10^5$ | $2.2 \times 10^5$ | $2.7 \times 10^5$ | $2.0 \times 10^5$ |
| Total shear strain A | $2.1 \times 10^5$ | $3.7 \times 10^5$ | $7.8 \times 10^5$ | $1.2 \times 10^5$ | $7.2 \times 10^4$ | $4.8 \times 10^6$ | $1.2 \times 10^7$ |

TABLE 1-continued

|  | Example 1 | Example 2 | Example 3 | Example 4 | Example 5 | Example 6 | Example 7 |
|---|---|---|---|---|---|---|---|
| Total shear energy E (Pa) | $3.8 \times 10^{10}$ | $9.0 \times 10^{10}$ | $2.8 \times 10^{11}$ | $7.2 \times 10^{9}$ | $1.2 \times 10^{10}$ | $2.9 \times 10^{12}$ | $7.2 \times 10^{12}$ |
| Dispersing state of clay layer (6) | ○ | ○ | ○ | ○ | ○ | ○ | ○ |
| Tensile strength (MPa) | 83.5 | 82 | 81.5 | 80.2 | 83.1 | 79.5 | 75.0 |
| Elongation (%) | 200 or more | 200 or more | 200 or more | 190 | 200 or more | 190 | 170 |
| Coefficient of $N_2$ gas permeability (7) | $7.12 \times 10^{-13}$ | $7.41 \times 10^{-13}$ | $7.35 \times 10^{-13}$ | $7.60 \times 10^{-13}$ | $7.43 \times 10^{-13}$ | $7.02 \times 10^{-13}$ | $6.95 \times 10^{-13}$ |

Kneader of Examples 1–14: a twin-screw extruder, other conditions are as shown in Table 5

TABLE 2

|  | Example 8 | Example 9 | Example 10 | Example 11 | Example 12 | Example 13 | Example 14 |
|---|---|---|---|---|---|---|---|
| Kind of resin | Nylon 66 | Nylon 12 | copolymer nylon | Nylon 46 | Nylon 11 | Nylon 610 | aromatic nylon |
| Type of organophilic clay (1) | C12-Mt | C18-Mt | C18-Mt | C12-Mt | C12-Mt | C18-Mt | C18-Mt |
| Added amount of organophilic clay (wt %) (2) | 1.5 | 2.2 | 2 | 1.5 | 1.5 | 2.5 | 2 |
| Screw type (3) | type 1 | type 1 | type 1 | type 1 | type 1 | type 1 | type 1 |
| Resin supplying speed (kg/h) | 10 | 10 | 5 | 10 | 10 | 10 | 10 |
| Screw speed (rpm) | 500 | 300 | 300 | 300 | 500 | 300 | 300 |
| Average reduced pressure on resin P'ave (Pa) (4) | $1.7 \times 10^{5}$ | $1.3 \times 10^{5}$ | $1.4 \times 10^{5}$ | $1.7 \times 10^{5}$ | $1.3 \times 10^{5}$ | $1.3 \times 10^{5}$ | $2.2 \times 10^{5}$ |
| Maximum reduced pressure on resin P'max (Pa) (5) | $2.7 \times 10^{5}$ | $2.0 \times 10^{5}$ | $3.4 \times 10^{5}$ | $3.3 \times 10^{5}$ | $3.0 \times 10^{5}$ | $2.6 \times 10^{5}$ | $4.1 \times 10^{5}$ |
| Total shear strain A | $3.7 \times 10^{5}$ | $2.1 \times 10^{5}$ | $2.1 \times 10^{5}$ | $2.1 \times 10^{5}$ | $3.7 \times 10^{5}$ | $2.1 \times 10^{5}$ | $2.1 \times 10^{5}$ |
| Total shear energy E (Pa) | $7.5 \times 10^{11}$ | $1.3 \times 10^{11}$ | $2.0 \times 10^{11}$ | $2.5 \times 10^{11}$ | $5.2 \times 10^{11}$ | $1.3 \times 10^{11}$ | $1.3 \times 10^{12}$ |
| Dispersing state of clay layer (6) | ○ | ○ | ○ | ○ | ○ | ○ | ○ |
| Tensile strength (MPa) | 88.4 | 55.0 | — | 115.0 | 65.2 | 70.2 | 90.5 |
| Elongation (%) | 85 | 250 or more | — | 60 | 200 or more | 200 or more | 40 |
| Coefficient of $N_2$ gas permeability (7) | — | $3.99 \times 10^{-12}$ | $8.90 \times 10^{-13}$ | — | — | — | — |

Kneader of Examples 1–14: a twin-screw extruder, other conditions are as shown in Table 5

TABLE 3

|  | Comparative Example 1* | Comparative Example 2 | Comparative Example 3 | Comparative Example 4 | Comparative Example 5 | Comparative Example 6 | Comparative Example 7 |
|---|---|---|---|---|---|---|---|
| Kind of resin | Nylon 6 | Nylon 6 | Nylon 6 | Nylon 6 | Nylon 6 | Nylon 6 | Nylon 6 |
| Type of organophilic clay (1) | C12$_{COOH}$-Mt | C18-Mt | C18-Mt | C18-Mt | C18-Mt | C18-Mt | C18-Mt |
| Added amount of organophilic clay (wt %) (2) | 2 | 2 | 2 | 2 | 2 | 2 | 2 |
| Screw type (3) | — | type 2 | — | — | — | type 1 | type 2 |
| Resin supplying speed (kg/h) | — | 10 | 0.8 | — | 210 | 0.2 | 0.2 |
| Screw speed (rpm) | — | 200 | 200 | 200 | — | 3000 | 3000 |
| Average reduced pressure on resin P'ave (Pa) (4) | — | $2.2 \times 10^{4}$ | $4.8 \times 10^{4}$ | $5.1 \times 10^{4}$ | $5.3 \times 10^{9}$ | $7.1 \times 10^{4}$ | $4.1 \times 10^{4}$ |
| Maximum reduced pressure on resin P'max (Pa) (5) | — | $2.6 \times 10^{4}$ | $8.7 \times 10^{4}$ | $6.4 \times 10^{4}$ | $9.7 \times 10^{9}$ | $1.8 \times 10^{5}$ | $5.9 \times 10^{4}$ |
| Total shear strain A | — | $2.0 \times 10^{4}$ | $3.1 \times 10^{4}$ | $7.2 \times 10^{4}$ | $1.0 \times 10^{4}$ | $1.8 \times 10^{8}$ | $8.4 \times 10^{7}$ |
| Total shear energy E (Pa) | — | $2.5 \times 10^{9}$ | $3.2 \times 10^{10}$ | $1.9 \times 10^{9}$ | $4.4 \times 10^{10}$ | $1.1 \times 10^{14}$ | $5.1 \times 10^{13}$ |
| Dispersing state of clay layer (6) | ○ | △ | △ | △ | × | ○ | △ |
| Tensile strength (MPa) | 82.0 | 75.0 | 81.5 | 81.0 | 88.4 | 15.5 | 10.0 |
| Elongation (%) | 200 or more | 0.95 | 50 | 35 | 0.1 | 0.25 | 0.15 |
| Coefficient of $N_2$ gas permeability (7) | $7.39 \times 10^{-13}$ | $9.12 \times 10^{-13}$ | $8.53 \times 10^{-13}$ | $8.20 \times 10^{-13}$ | $1.20 \times 10^{-12}$ | $6.93 \times 10^{-13}$ | $8.20 \times 10^{-13}$ |

*resin composite material produced by a polymerizing method
Kneaders of Comparatives 2, 6–13: a twin-screw extruder, Comparative 3: a compact size kneader, Comparative 4: a closed-type kneader, Comparative 5: a special high speed rheometer, other conditions are as shown in Table 5

TABLE 4

|  | Comparative Example 8 | Comparative Example 9 | Comparative Example 10 | Comparative Example 11 | Comparative Example 12 | Comparative Example 13 |
|---|---|---|---|---|---|---|
| Kind of resin | Nylon 12 | copolymer nylon | Nylon 46 | Nylon 11 | Nylon 610 | aromatic nylon |
| Type of organophilic clay (1) | C18-Mt | C18-Mt | C12-Mt | C12-Mt | C18-Mt | C18-Mt |
| Added amount of organophilic clay (wt %) (2) | 2.2 | 2 | 1.5 | 1.5 | 2.5 | 2 |
| Screw type (3) | type 2 | type 2 | type 2 | type 2 | type 2 | type 2 |
| Resin supplying speed (kg/h) | 10 | 10 | 10 | 10 | 10 | 10 |

TABLE 4-continued

|  | Comparative Example 8 | Comparative Example 9 | Comparative Example 10 | Comparative Example 11 | Comparative Example 12 | Comparative Example 13 |
|---|---|---|---|---|---|---|
| Screw speed (rpm) | 150 | 100 | 200 | 200 | 200 | 200 |
| Average reduced pressure on resin Pave (Pa) (4) | $1.8 \times 10^4$ | $3.3 \times 10^4$ | $4.9 \times 10^4$ | $1.3 \times 10^4$ | $2.8 \times 10^4$ | $5.3 \times 10^4$ |
| Maximum reduced pressure on resin P'max (Pa) (5) | $2.5 \times 10^4$ | $4.3 \times 10^4$ | $8.2 \times 10^4$ | $4.0 \times 10^4$ | $3.8 \times 10^4$ | $7.9 \times 10^4$ |
| Total shear strain A | $1.8 \times 10^4$ | $2.4 \times 10^4$ | $2.5 \times 10^4$ | $2.5 \times 10^4$ | $1.6 \times 10^4$ | $2.5 \times 10^4$ |
| Total shear energy E (Pa) | $7.9 \times 10^9$ | $9.7 \times 10^9$ | $2.2 \times 10^{10}$ | $1.9 \times 10^{10}$ | $1.0 \times 10^{10}$ | $1.2 \times 10^{11}$ |
| Dispersing state of clay layer (6) | Δ | Δ~x | Δ | Δ | Δ | Δ |
| Tensile strength (MPa) | 45 | — | 105 | 57 | 55 | 78.2 |
| Elongation (%) | 60 | — | 10 | 75 | 50 | 10 |
| Coefficient of $N_2$ gas permeability (7) | $8.01 \times 10^{-13}$ | $1.70 \times 10^{-12}$ | — | — | — | — |

☆ resin composite material produced by a polymerizing method
Kneaders of Comparatives 2, 6–13: a twin-screw extruder, Comparative 3: a compact size kneader, Comparative 4: a closed-type kneader, Comparative 5: a special high speed rheometer, other conditions are as shown in Table 5

TABLE 5

(1) C18-Mt: montmorillonite made organophilic with octadecyl-ammonium ion
    C12-Mt: montmorillonite made organophilic with dodecyl-ammonium ion
    C12$_{COOH}$-Mt: montmorillonite made organophilic with amino-dodecanoic acid
(2) The added amount of organophilic clay is shown in an amount as an inorganic substance removed organic substance
(3) Type 1: a type by which a high reduced pressure on resin, a high total shear strain and a high shear energy per unit volume are applied
    Type 2: a type which is used in an ordinary twin-screw kneading
(4) Values in the loading region where P'max was observed
(5) Values in the loading region
(6) ○: Satisfactory dispersion condition. The clay layer is micro-dispersed as almost individual monolayers.
    Δ: Poor dispersion condition. Aggregation of 2 or 3 layers is observed over 50%.
    x: Extremely poor dispersion condition. Almost all of the dispersed layers are aggregations of several tens layers or more.
(7) Determined at 60° C., units (cm$^3$ · cm/cm$^{-2}$ · s$^{-1}$cmHg$^{-1}$)

As evident from Tables shown above, a kneading process under the conditions described in Examples allows a clay layer to be micro-dispersed and provides a polymeric composite material having dynamic properties and gas barrier performance which are comparable with a composite produced by a polymerization process.

In addition, it becomes easy to produce a polymeric composite material which has conventionally required a large number of producing steps. Furthermore, any other resin may also be applied to a method in Examples to produce a polymeric composite material in which a clay layer is micro,dispersed.

(Comparison Between the Present Invention and Prior Art)

As described above with regard to the background of the invention, Japanese Laid-Open Patent Publication No. 9-217012 discloses a mixing coefficient Mix and a shear coefficient F. This prior art is discussed here while comparing with the present invention.

(1) Mixing Coefficient Mix $$\text{Mixing coefficient Mix} = \{(Qb/Qf) \times (M-1) \times N\}/Q \qquad \text{Equation (1)}$$

{Qb: Back flow of resin around kneading screw (m$^3$/s), Qf: Forward flow of resin around kneading screw (m$^3$/s), M: Number of fins in kneading disk, N: Screw speed (rps), Q: Volume flow rate(m$^3$/s)}

When a mixing coefficient Mix (Equation C1) shown above is used to calculate the range of Qb/Qf based on the values in Comparative Example 3 whose mixing coefficient Mix is taught in Application Laid-Open No.9-217012 to be the highest, the range:

$$Qb/Qf < 2 \times 10^{-5}$$

is obtained. Although the number of the fins in a screw depends on the screw design, an increased M results in a reduced Qb/Qf and a further reduced back flow Qb. Accordingly, Qb/Qf is not considered to exceed the value indicated above. The fact that Qb/Qf is extremely low means that the pressure on resin is zero throughout the entire region of the inside of an extruder because a loading region in which a resin is loaded does not exist.

Based on the understanding discussed above the prior art described above is not capable of kneading a &lay layer with a thermoplastic resin sufficiently.

(2) Shear Coefficient F $$\text{Shear coefficient } F = \{(\pi DN)/H\} \times t$$

{D: Average sectional diameter of screw (mm), N: Screw speed (rps), H: Average channel depth of screw (mm), t: Residential time (sec)}

A shear coefficient F described above is a value calculated exclusively for a kneader and/or an extruder having a screw, and obtained by multiplying an average shear rate throughout the entire screw by a residential time throughout the entire screw.

On the contrary, in the calculation of a total shear strain A according to the present invention, devices are not limited as long as they can apply a shear stress. When a kneader and/or an extruder having a screw is relevant, a shear rate γ' as a calculation factor for a total shear strain A is applicable only to a gap between a screw tip and a cylinder in a kneading region and the residential time is applicable only to a loading region. Accordingly, the concept of a shear coefficient F in the prior art described above is different from that of a total shear strain A according to the present invention.

Further, based on the values indicated in Table 1 in the prior art described above, the region of a total shear strain A according to the present invention is calculated to be A $<1 \times 10^5$. A shear rate γ' as a factor required for obtaining a total shear strain A is obtained according to Equation (3) shown below.

$$\text{Shear rate } \gamma' = \{(\pi D'N)/\delta\} \qquad \text{Equation (3)}$$

Figure 3:
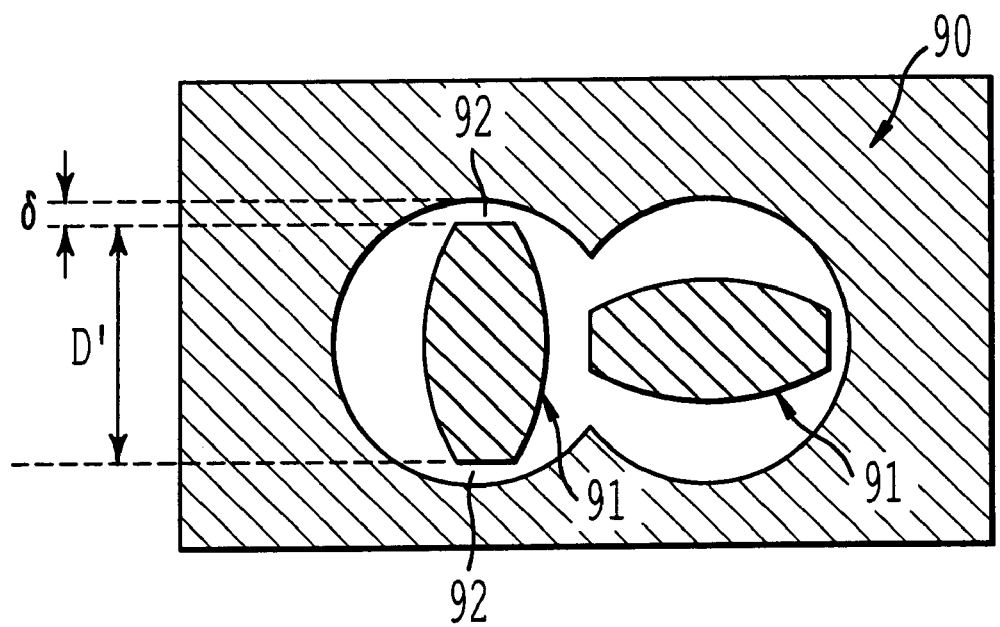
FIG. 3 is a sectional explanatory view of a continuous kneader of a prior art.

D': Diameter of screw 91 in cylinder 90 in FIG. 3
δ: Tip clearance 92 in cylinder 90 in FIG. 3

In the calculation, the diameter of screw 91 D'=25 mm and the tip clearance δ=1 mm were employed as assumably acceptable values since the shape factors of a twin-screw extruder ZSK25 produced by WELNER AND PHULIDELER are unknown. The residential time of loaded region was also assumed to be 80% of the entire residential time. As a result, a method for kneading in the prior art described above is not considered to be capable of exerting a shear stress sufficient to achieve a complete micro-dispersion of a clay layer.

As discussed above, a method according to the present invention achieves a higher micro-dispersion of a polymer and an organophilic clay when compared with a prior art, since it involves novel physical parameters described above.

INDUSTRIAL APPLICABILITY

According to the present invention, it is possible to provide a polymeric composite material in which an organophilic clay can be micro-dispersed in a thermoplastic resin and a method for producing the same.

What is claimed is:

1. A method for producing a polymeric composite material comprising:

melt-kneading an organophilic clay and a polymer so that the average value (P'ave) and the maximum value (P'max) of a reduced pressure on a kneaded material comprising the organophilic clay and polymer at one or more loading regions in a kneader are within the ranges shown below and that a total shear strain (A) and/or a total shear energy per unit volume (E) in all loading regions of the kneaded material are within the ranges of $P'ave \geq 5 \times 10^4 (Pa)$, $P'max \geq 1 \times 10^5 (Pa)$, $10^5 \leq A \leq 10^7$, and $10^{10}(Pa) \leq E \leq 10^{14}(Pa)$.

wherein 50% or more of the entire layers of the layered organophilic clay are dispersed as monolayers.

2. The method according to claim 1, wherein P'ave is within the range from $5 \times 10^4$ to $2 \times 10^6$ (Pa).

3. The method according to claim 1, wherein P'max is within the range from $2 \times 10^5$ to $1 \times 10^7$ (Pa).

4. The method according to claim 1, wherein the total shear strain (A) is within the range of $10^5 \leq A \leq 10^6$.

5. The method according to claim 1, wherein the total shear energy (E) is within the range from $1 \times 10^{10}$ to $1 \times 10^{12}$ (Pa).

6. The method according to claim 1, wherein a clay in the organophilic clay is a layered clay mineral.

7. The method according to claim 6, wherein the layered clay mineral is one or more selected from the group consisting of montmorillonite, saponite, hectorite, beidellite, stibensite, nontllite and mica.

8. The method according to claim 1, wherein the organophilic clay is made organophilic with an organic agent, and the organic agent is one or more selected from the group consisting of primary to quaternary ammonium, hexylammonium ion, octylammonium ion, 2-ethylhexylammonium ion, dodecylammonium ion, laurylammonium ion, octadecylammonium ion, dioctyldimethylammonium ion, trioctylammonium ion, dioctadecyldimethylammonium ion and trioctadecylammonium ion.

9. The method according to claim 1, wherein the polymer is one or more selected from the group consisting of polyester, polycarbonate, polyacetal, polyallylate, polyamide, polyamideimide, polyetherimide, polyphenylene ether, polyphenylene sulfide, polyether sulfone, polyether ketone, polyphthalamide, polyether nitrile, polyether sulfone, polybenzimidazole, polycarbodiimide, polysiloxane, acrylic resins, polymethyl(meth)acrylate, poly(meth)acrylamide, acryl rubber, polyethylene tetrafluoride, fluorine resin, fluorine rubber, liquid crystal polymer, epoxy resin, melamine resin, urea resin, diallylphthalate resin, phenol resin, polysilane, silicone resin, urethane resin, polyethylene, polypropylene, polybutene, polypentene, ethylene-propylene copolymer, ethylene-butene copolymer, polybutadiene, polyisoprene, hydrogenated polybutadiene, hydrogenated polyisoprene, ethylene-propylene-diene copolymer, ethylene-butene-diene copolymer, butyl rubber, polymethylpentene, polystyrene, styrene-butadiene copolymer and styrene-hydrogenated butadiene copolymer.

10. The method according to claim 1, wherein the organophilic clay is a montmorillonite made organophilic with octadecylamine;

the polymer is Nylon 6;

the average value P'ave is within the range from $5 \times 10^4$ to $2 \times 10^6$ (Pa);

the maximum value P'max is within the range from $2 \times 10^5$ to $1 \times 10^7$ (Pa);

the total shear strain A is within the range from $1 \times 10^5$ to $1 \times 10^6$ (Pa); and, the total shear energy E is within the range from $1 \times 10^{10}$ to $1 \times 10^{12}$ (Pa).

11. The method according to claim 1, wherein said melt-kneading is with a twin-screw extruder.

12. The method according to claim 1, wherein 80% or more of the entire layers of the layered organophilic clay are dispersed as monolayers.

13. The method according to claim 1, further comprising molding the polymeric composite material.

* * * * *